United States Patent [19]

Wachholz et al.

[11] Patent Number: 5,132,270
[45] Date of Patent: Jul. 21, 1992

[54] ULTRASOUND METHOD OF REACTIVATING DEACTIVATED HYDROGENATION CATALYTS

[75] Inventors: Gerhard Wachholz, Marl; Gerhard Thelen, Nottuln; Heinz-Werner Voges, Dorsten, all of Fed. Rep. of Germany

[73] Assignee: Huels Aktiengesellschaft, Marl, Fed. Rep. of Germany

[21] Appl. No.: 726,287

[22] Filed: Jul. 5, 1991

[30] Foreign Application Priority Data

Aug. 30, 1990 [DE] Fed. Rep. of Germany ....... 4027419

[51] Int. Cl.⁵ .................. B01J 23/96; B01J 37/34; C07C 5/02
[52] U.S. Cl. .......................................... 502/5; 502/31; 502/522; 585/277
[58] Field of Search ..................... 502/5, 522

[56] References Cited

U.S. PATENT DOCUMENTS

| 4,572,439 | 2/1986 | Pitzer | 421/24 |
| 4,914,256 | 4/1990 | Rodewald | 502/5 |
| 4,914,560 | 4/1990 | Rodewald | 502/5 |

Primary Examiner—Paul E. Konopka
Attorney, Agent, or Firm—Oblon, Spivak, McClelland, Maier & Neustadt

[57] ABSTRACT

Deactivated hydrogenation catalysts of ruthenium metal deposited on an aluminum oxide support are regenerated by treatment with ultrasound.

7 Claims, No Drawings

ULTRASOUND METHOD OF REACTIVATING DEACTIVATED HYDROGENATION CATALYTS

BACKGROUND OF THE INVENTION

1. Field of the Invention

The present invention relates to the reactivation, by ultrasound, of hydrogenation catalysts which are "deactivated", i.e. have lost appreciable effectiveness or have become ineffective, which catalysts contain ruthenium metal deposited on an aluminum oxide support.

2. Description of the Background

It is known that ruthenium deposited on aluminum oxide is a suitable catalyst for hydrogenation of unsaturated hydrocarbons and of aldehydes and ketones. As described Houben-Weyl, "Methoden der Organischen Chemie", Vol. 4/1c, p. 20, hydrogenation products obtained on $Ru/Al_2O_3$ of cycloolefins multiply substituted on the double bond preferably have a cis-configuration, if the hydrogenation is carried out under certain temperature and pressure conditions. An example, of such as hydrogenation is the conversion of α-pinene to cis-pinane:

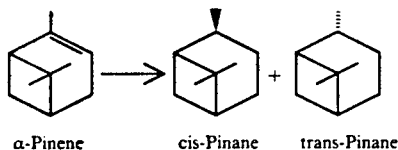

α-Pinene     cis-Pinane     trans-Pinane

It is also known that the catalytic activity of $Ru/Al_2O_3$ in practice drops relatively rapidly, e.g. in a fixed bed in a hydrogenation reactor through which an olefinic compound and hydrogen are passed, and this reduction in activity can lead to complete inactivation. The reduction in activity occurs even in the absence of so-called catalyst poisons, which, in general, are compounds containing heteroatoms with free electron pairs such as, e.g. Cl, Br, I, S, Se, Te, N, P, Sb, and As, which- compounds may be present in trace amounts in the substrate which is being hydrogenated, in solvents which may be used or in carrier gases or in gaseous hydrogen.

The usual measures to counter loss of hydrogenation activity of $Ru/Al_2O_3$ catalysts consists of increasing the temperature and pressure and reducing the amount of substrate which is being hydrogenated, which substrate is passed over the fixed catalyst bed per unit time. However, the duration of effectiveness of these measures is limited. The loss of activity continues. Moreover, when the temperature is repeatedly raised, the selectivity of the $Ru/Al_2O_3$ catalyst in forming the cis-hydrogenation product is lost.

The use of $Ru/Al_2O_3$ catalysts for selective hydrogenation is thus limited under the state of the art. $Ru/Al_2O_3$ catalysts, which have appreciably or completely lost their activity, do not have a different outward appearance; one cannot detect any caking together of catalyst granules which may occur as a result of deposition of higher molecular weight or polymerized byproducts on the surface.

Methods have been described for reactivating hydrogenation catalysts containing active components in the form of metals of Group VII of the Periodic System. According to U.S. Pat. No. 3,256,205, e.g., the catalyst is treated with acid solutions of pH $\leq 2$. However, $Ru/Al_2O_3$ catalysts cannot be treated in this manner because in acid medium α-pinene undergoes a Wagner-Meerwein rearrangement.

A need therefore continues to exist for a suitable method of reactivating deactivated $Ru/Al_2O_3$ catalysts which does not have the known disadvantages.

SUMMARY OF THE INVENTION

Accordingly, one object of the present invention is to provide an effective method of regenerating deactivated hydrogenation catalysts.

Briefly, this object and other objects of the invention as hereinafter will become more readily apparent can be achieved by a method of regenerating deactivated $Ru/Al_2O_3$ hydrogenation catalysts by treatment with ultrasound waves. Catalysts particularly suitable for regeneration are those which have the capability of stereospecific hydrogenation, e.g. of hydrogenating α-pinene to cis-pinane.

DESCRIPTION OF THE PREFERRED EMBODIMENTS

The discovery of the present invention is that deactivated hydrogenation catalysts which contain ruthenium on an aluminum oxide support can be regenerated by treatment with ultrasound.

The use of ultrasound for catalyst regeneration is described in U.S. Pat. 4,086,184, which technique has been applied to hydrocracking catalysts which have become ineffective because of deposits of coking products. The deactivated catalysts are first treated with ultrasound and then are subjected to an oxidizing gas at 930°–1,050° F.

Ultrasound has also been used for regeneration of catalysts employed for removing $NO_x$ from combustion exhaust gases, as described in 1985 *Khim. Tekhnol.* (Kiev), 3:17-19 (C.A. 103:146460) and 1985 *Khim. Prom.* (Moscow), 9:549-50 (C.A. 103:182947), wherein the manner of action of the ultrasound was to remove dust-like components on the substrate (combustion gas) which had deposited on the catalyst. Because $Ru/Al_2O_3$ catalysts which are depleted or inactivated show no indications of deposition of impurities or higher molecular weight byproducts or subsequent products of the substrate, which products are no longer soluble, the regenerating effect of treatment with ultrasound was unforeseeable and surprising. The source of this effect may possibly be that ultrasound changes the structural form (crystal structure) of the depleted or inactivated $Ru/Al_2O_3$ catalyst in such a way as to regenerate the active form.

The practical application of ultrasound is simple. The $Ru/Al_2O_3$ catalyst is exposed to the action of the ultrasound in a suitable liquid medium, namely any medium which does not chemically alter the catalyst and does not leave deposits on the catalyst surface. Preferably the hydrocarbon which is being hydrogenated, or its hydrogenation product, is used as the liquid medium. This provides the advantage that no subsequent steps to remove foreign material are required.

The ultrasound treatment can be conducted at periodic intervals, outside the hydrogenation reactor, as soon as a reduction in hydrogenation activity is noticed. If the ultrasound treatment is conducted outside the hydrogenation reactor in a medium comprised of the substrate which is being hydrogenated or the hydrogenation product of same, then no special subsequent processing of the regenerated $Ru/Al_2O_3$ catalyst is required. For example, the catalyst can be removed directly from the ultrasound bath, and can be returned to the hydrogenation reactor without drying, calcining, or similar steps.

Obviously, it is also possible to have an ultrasound source in a fixed installation in situ to carry out the regeneration in the hydrogenation reactor. The treatment may then be carried out while the hydrogenation is in progress. Under these conditions, brief ultrasound treatments carried out periodically will be sufficient to prevent reduction of hydrogenation activity.

The advantage afforded by the invention lies particularly in that even completely inactivated $Ru/Al_2O_3$ catalysts can be regenerated in an economical process to a condition where their activity is comparable to that of new catalysts.

The ultrasound sources should have a frequency of 18–500 kHz; generally the range around 20 kHz is completely adequate. The acoustic intensity should be between 10 and 100 $W/CM^2$. Any commercially available ultrasound source may be used, e.g.:

ultrasound rods for regenerative treatment in the hydrogenation reactor, and ultrasound baths for treatment outside the reactor.

The duration of treatment required to reactivate deactivated catalyst may be between 10 min and 10 hr. It depends on the degree of inactivation, but in most cases c. 60 min is sufficient. In general, as the power output of the ultrasound source is increased the duration of treatment decreases.

The temperature during the ultrasound treatment must be chosen such that the liquid medium has sufficiently low viscosity. In the case of an ultrasound source installed in the reactor, the temperature will be that of the hydrogenation. If the viscosity of the liquid medium is too high, the acoustic intensity will be excessively attenuated.

Having generally described this invention, a further understanding can be obtained by reference to certain specific examples which are provided herein for purposes of illustration only and are not intended to be limiting unless otherwise specified.

EXAMPLE 1

Typical commercial α-pinene was hydrogenated on a catalyst which contained 1% of ruthenium on aluminum oxide (Engelhard fixed bed catalyst TCH 2933), at 300 bar and 50° C. The loading of the catalyst in the continuous-flow hydrogenation reactor was 0.2–0.3 l α-pinene per l catalyst per hr. The residual content of α-pinene after the stream exited the hydrogenation reactor was <0.1%, and the selectivity for cis-pinane was 95–97%. After 23 days continuous operation, the α-pinene content increased, and after 48 hr it had reached 30.4%. The catalyst was removed from the reactor and treated 3 hr in an ultrasound bath, with α-pinene as solvent. Then the catalyst was re-charged to the reactor, without drying. After a short transition period, the α-pinene content was again <0.1%.

EXAMPLE 2

α-Pinene was hydrogenated analogously to the method of Example 1, but on a Ru catalyst supplied by Rhone-Poulenc (TC 402, 1% $Ru/Al_2O_3$), at 300 bar and 70° C. After 17 days, the residual α-pinene content had increased from an initial <0.1% to 7.2%. The depleted hydrogenation catalyst was treated analogously to the method of Example 1, following which a residual content of α-pinene of <0.1% was again achieved.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of regenerating deactivated hydrogenation catalysts for the hydrogenation of unsaturated hydrocarbons, which catalysts contain ruthenium metal deposited on an aluminum oxide support comprising:

treating said catalysts with ultrasound in a liquid medium which does not cause any chemical change to these catalysts;

wherein said deactivated catalysts show no indications of deposition of impurities or higher molecular weight by-products or subsequent products of the substrate which are no longer soluble.

2. The method of claim 1, wherein said unsaturated hydrocarbons are α-pinene.

3. The method according to claim 1, wherein the material being hydrogenated, or its hydrogenation product, is said liquid medium.

4. The method according to claim 1, wherein the ultrasound treatment is conducted outside the hydrogenation reactor in an ultrasound bath.

5. The method according to claim 1, wherein the ultrasound treatment is conducted in the hydrogenation reactor itself by means of an ultrasound source disposed in said reactor.

6. The method according to claim 1, wherein the ultrasound source has a transmission frequency of 18–50 kHz and an output power of 10–100 $W/CM^2$.

7. The method according to claim 1, wherein the ultrasound treatment is conducted for 10 min to 10 hr.

* * * * *